(12) United States Patent
Babb

(10) Patent No.: US 8,781,150 B2
(45) Date of Patent: Jul. 15, 2014

(54) MULTIPLE MAGNETIC AIR GAP MOTOR

(75) Inventor: Alan Babb, Burnsville, MN (US)

(73) Assignee: Robert Bosch GmbH, Stuttgart (DE)

( * ) Notice: Subject to any disclaimer, the term of this patent is extended or adjusted under 35 U.S.C. 154(b) by 722 days.

(21) Appl. No.: 13/026,394

(22) Filed: Feb. 14, 2011

(65) Prior Publication Data

US 2012/0207339 A1    Aug. 16, 2012

(51) Int. Cl.
| | |
|---|---|
| H04R 1/00 | (2006.01) |
| H04R 1/02 | (2006.01) |
| H04R 9/06 | (2006.01) |
| H04R 11/02 | (2006.01) |
| H04R 9/02 | (2006.01) |
| H02K 9/16 | (2006.01) |

(52) U.S. Cl.
CPC .............. *H04R 9/022* (2013.01); *H04R 9/025* (2013.01); *H02K 9/16* (2013.01)
USPC .......................................... 381/397; 381/421

(58) Field of Classification Search
CPC ....... H02K 9/02; H02K 9/16; H02K 41/0356; H04R 9/022; H04R 9/025
USPC .......................... 381/397, 400, 412, 419, 421
See application file for complete search history.

(56) References Cited

U.S. PATENT DOCUMENTS

| | | | |
|---|---|---|---|
| 5,828,767 A | 10/1998 | Button | |
| 6,611,606 B2 | 8/2003 | Guenther | |
| 6,774,510 B1 | 8/2004 | Moro et al. | |
| 6,847,726 B2 | 1/2005 | Button et al. | |
| 7,012,345 B2 | 3/2006 | Moro et al. | |
| 7,057,314 B2 | 6/2006 | Moro | |
| 2001/0031063 A1* | 10/2001 | Langford et al. | 381/397 |
| 2004/0131223 A1* | 7/2004 | Stiles | 381/421 |
| 2005/0041831 A1* | 2/2005 | Stiles et al. | 381/421 |
| 2006/0251286 A1* | 11/2006 | Stiles | 381/421 |
| 2007/0237351 A1* | 10/2007 | Hyde et al. | 381/397 |

\* cited by examiner

*Primary Examiner* — Jesse Elbin
(74) *Attorney, Agent, or Firm* — Michael Best & Friedrich LLP

(57) ABSTRACT

A low frequency transducer arrangement includes a substantially cylindrical structure surrounding a pole piece. The pole piece and the substantially cylindrical structure define a substantially cylindrical air gap therebetween. Two opposite ends of the air gap are both open and separated from each other in an axial direction. A first magnet is disposed in either the pole piece or the substantially cylindrical structure. A second magnet is separated in the axial direction from the first magnet by a middle magnetic gap. The second magnet is disposed in either the pole piece or the substantially cylindrical structure. The first and second magnets provide flux in a same direction in the middle magnetic gap. A top magnetic gap is disposed axially adjacent the first magnet and opposite the middle magnetic gap. A bottom magnetic gap is disposed axially adjacent the second magnet and opposite the middle magnetic gap. A voice coil is at least partially disposed in the air gap and operates in the middle magnetic gap.

20 Claims, 10 Drawing Sheets

MULTIPLE MAGNETIC AIR GAP MOTOR

BACKGROUND OF THE INVENTION

1. Field of the Invention

The present invention relates to high power low frequency transducers, and, more particularly, to high power low frequency transducers having a magnetic structure with an air gap and a voice coil located in the air gap.

2. Description of the Related Art

A high power low frequency transducer, commonly referred to as a "loudspeaker," has a magnetic structure with "air gaps" and voice coils that are located in the air gap(s). At normal operating sound pressure levels, it is common for the voice coil temperature to reach 280° C. (536° F.). This high temperature has the deleterious effect of reducing the transducer's efficiency and reliability. Known techniques for reducing the voice coil temperature include using air circulation to cool the voice coil, but these known techniques have not provided sufficient air flow in terms of volume and velocity in order to be effective.

Another problem with known high power loudspeakers is that the extreme force involved in oscillating the voice coil in axial directions sometimes results in physical damage to the loudspeaker. For example, the inertia of the moving voice coil may cause the voice coil to oscillate beyond a safe range of movement, thereby resulting in collisions between speaker components, or pulling speaker components apart from one another.

What is neither disclosed nor suggested by the prior art is a high power low frequency transducer in which the operating temperature of the voice coil is effectively limited to thereby preserve the voice coil's efficiency and reliability, and in which the range of movement of the voice coil is effectively limited to thereby prevent damage to the transducer.

SUMMARY OF THE INVENTION

The present invention is directed to a high power low frequency transducer having a magnetic structure with an air gap and a voice coil located in the air gap. In one embodiment, two magnets are magnetized in opposite polarities. These magnets are located on opposite sides of a steel disk and on the same, inner side of the air gap. Both ends of the air gap are open to atmosphere. Two more steel disks are disposed above the upper magnet and below the lower magnet, respectively. A steel tube surrounds the structure to define the outer boundary of the air gap and thereby form a top magnetic gap above the magnets, a center magnetic gap between the magnets, and a bottom magnetic gap below the magnets.

Aluminum rings may be adhered to the exposed ends of the magnets such that the rings are flush with the steel disks, thereby providing the air gap with a smooth boundary for improved air flow. The flux from the two magnets may be in the same direction in the middle magnetic gap, where the coil operates. The flux in the top and bottom magnetic gaps may be opposite to the flux in the middle magnetic gap, thereby inhibiting the coil from traveling beyond desired limits. In a second embodiment, the magnets have the same polarity and are disposed on opposite sides of the air gap. Other aspects may be similar to the first embodiment.

In one embodiment, one magnet is disposed on the inside of the air gap and another magnet is disposed on the outside of the air gap. With this configuration, the two magnets may have the same polarity. Advantageously, if the magnets have the same polarity, the loudspeaker may be assembled prior to the magnets being magnetized.

The invention comprises, in one form thereof, a low frequency transducer arrangement including a substantially cylindrical structure surrounding a pole piece. The pole piece and the substantially cylindrical structure define a substantially cylindrical air gap therebetween. Two opposite ends of the air gap are both open to air flow therethrough and are separated from each other in an axial direction. A first magnet is disposed in either the pole piece or the substantially cylindrical structure. A second magnet is separated in the axial direction from the first magnet by a middle magnetic gap. The second magnet is disposed in either the pole piece or the substantially cylindrical structure. The first and second magnets provide flux in a same direction in the middle magnetic gap. A top magnetic gap is disposed axially adjacent the first magnet and opposite the middle magnetic gap. A bottom magnetic gap is disposed axially adjacent the second magnet and opposite the middle magnetic gap. A voice coil is at least partially disposed in the air gap and operates in the middle magnetic gap.

The invention comprises, in another form thereof, a low frequency transducer arrangement including a substantially cylindrical structure surrounding a pole piece. The pole piece and the substantially cylindrical structure define a substantially cylindrical air gap therebetween. Two opposite ends of the air gap are both open to air flow therethrough and are separated from each other in an axial direction. An upper magnet is disposed in either the pole piece or the substantially cylindrical structure. A lower magnet is separated in the axial direction from the upper magnet by a magnetic gap. The lower magnet is disposed in either the pole piece or the substantially cylindrical structure. A voice coil is at least partially disposed in the air gap and operates in the magnetic gap. The lower magnet limits downward axial movement of the voice coil within the air gap.

The invention comprises, in yet another form thereof, a low frequency transducer arrangement including a substantially cylindrical structure surrounding a pole piece. The pole piece and the substantially cylindrical structure define a substantially cylindrical air gap therebetween. Two opposite ends of the air gap both enable air to flow therethrough. The two opposite ends of the air gap are separated from each other in an axial direction. A first magnet is disposed in either the pole piece or the substantially cylindrical structure. A second magnet is separated in an axial direction from the first magnet by a magnetic gap. The second magnet is disposed in either the pole piece or the substantially cylindrical structure. The first and second magnets provide flux in a same direction in the magnetic gap. The first magnet and/or the second magnet are recessed in an outer surface of the pole piece and/or recessed in an inner surface of the cylindrical structure. A non-ferrous ring is disposed in a recess between the air gap and the at least one of the first magnet and the second magnet such that the ring provides the air gap with a substantially smooth boundary. A voice coil is at least partially disposed in the air gap and operates in the magnetic gap.

An advantage of the present invention is that it provides a straight line air path from top to bottom to allow forced air cooling to remove heat from the voice coil.

Another advantage of the present invention is that it enables the top and bottom magnetic gaps to be used for magnetic limiting.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
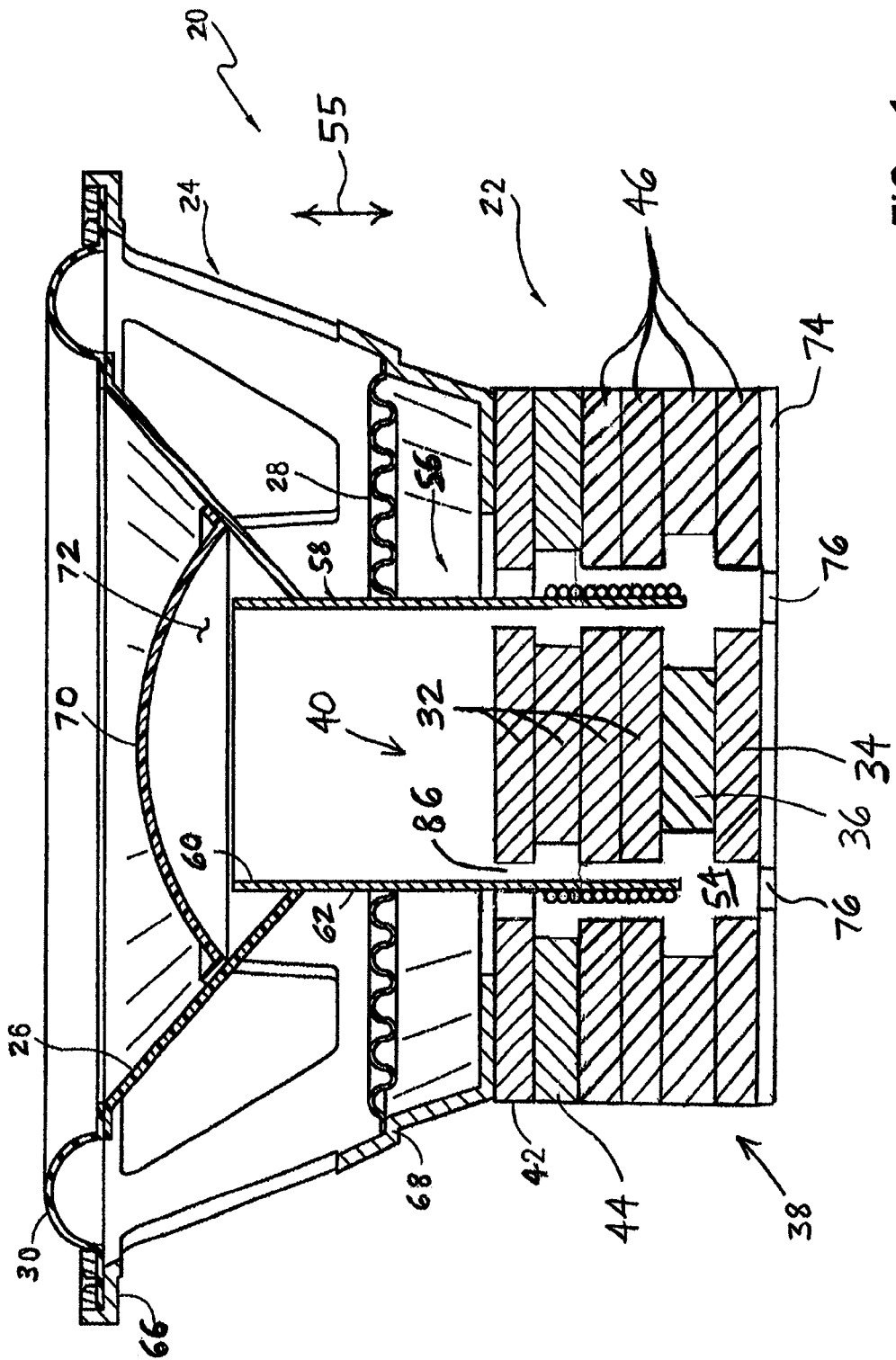
FIG. 1 is a cross-sectional view of one embodiment of a loudspeaker of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of a loudspeaker 20 of the present invention including a motor assembly 22, a frame 24 mounted to motor assembly 22, a diaphragm 26, a lower suspension or spider 28 and an upper suspension or surround 30. Motor assembly 22 includes a pole piece 40 having a stack of four steel discs 32, a permanent magnet 36 below the bottom one of discs 32, and another steel disc 34 disposed below magnet 36. Each of discs 32, magnet 36 and disc 34 may be adhered to each other.

Motor assembly 22 also includes a cylindrical structure 38 surrounding pole piece 40 and having a steel annular top ring 42 disposed atop an annular ring magnet 44. Magnet 44 in turn, is disposed atop a stack of another four steel annular rings 46. Each of top ring 42, magnetic ring 44, and rings 46 may be adhered to each other. Discs 32, 34 and rings 42, 46 may all be made of low carbon steel.

An air gap 54 is defined between cylinder 38 and pole piece 40. The two opposite ends of air gap 54 are both open to air flow therethrough and are separated from each other in an axial direction indicated by double arrow 55.

A voice coil 56 is also provided which includes a hollow, cylindrical-shaped former 58, having an inner surface 60 and an outer surface 62 which receives a wire winding 64. Former 58 is concentrically disposed about pole piece 40, and voice coil 56 is axially movable within air gap 54 during operation of speaker 20.

Voice coil 56 is held in place with respect to pole piece 40 by diaphragm 26, spider 28 and surround 30. One end of diaphragm 26 is affixed to former 58 by adhesive or the like, and the opposite end of diaphragm 26 connects to surround 30. Surround 30, in turn, is mounted to an upper end 66 of frame 24. Diaphragm 26 and surround 30 collectively provide support for voice coil 56, in addition to the lower suspension or spider 28. An inner annular edge of spider 28 connects to former 58, and an outer annular edge of spider 28 mounts to a seat 68 formed in frame 24.

A dust cap 70 is mounted to the diaphragm 26 in position to overlie the voice coil 56 and pole piece 40 in order to protect such elements from dirt, dust and other contaminants. A dust cap cavity 72 is thus defined in the space surrounded by the lower portion of diaphragm 26, dust cap 70, voice coil 56 and pole piece 40. In response to the input of electrical energy to wire winding 64, voice coil 56 is moved axially with respect to the fixed motor assembly 22. Because diaphragm 26, spider 28, surround 30 and dust cap 70 are operatively connected to former 58, these components also move axially along with voice coil 56. As a result of axial movement of diaphragm 26 and dust cap 70, air flows from outside of speaker 20 and into and out of cavity 72. That is, air is pumped into and out of cavity 72.

Pole piece 40 has an exterior surface that is both stepped and annular. In the specific embodiment shown in FIG. 1, the top one of steel discs 32 has a larger diameter than the disc 32 immediately below. Magnet 36 has a smaller diameter than any of discs 32, 34. Ring magnet 44 is disposed opposite the smallest of discs 32, and has an inner diameter that is larger than that of top steel ring 42 and three of steel rings 46. However, the steel ring 46 opposite magnet 36 has a larger inner diameter than any other element in cylinder 38, including ring magnet 44.

A steel circular base plate 74 is adhered to both a bottom surface of cylinder 38 and a bottom surface of pole piece 40, and thereby interconnects cylinder 38 and pole piece 40. Base plate 74 includes a plurality of circumferentially evenly spaced throughbores 76 that fluidly interconnect air gap 54 with ambient air. A gap 86 is defined between a top one of discs 32 and former 58 of voice coil 56.

Figure 2:
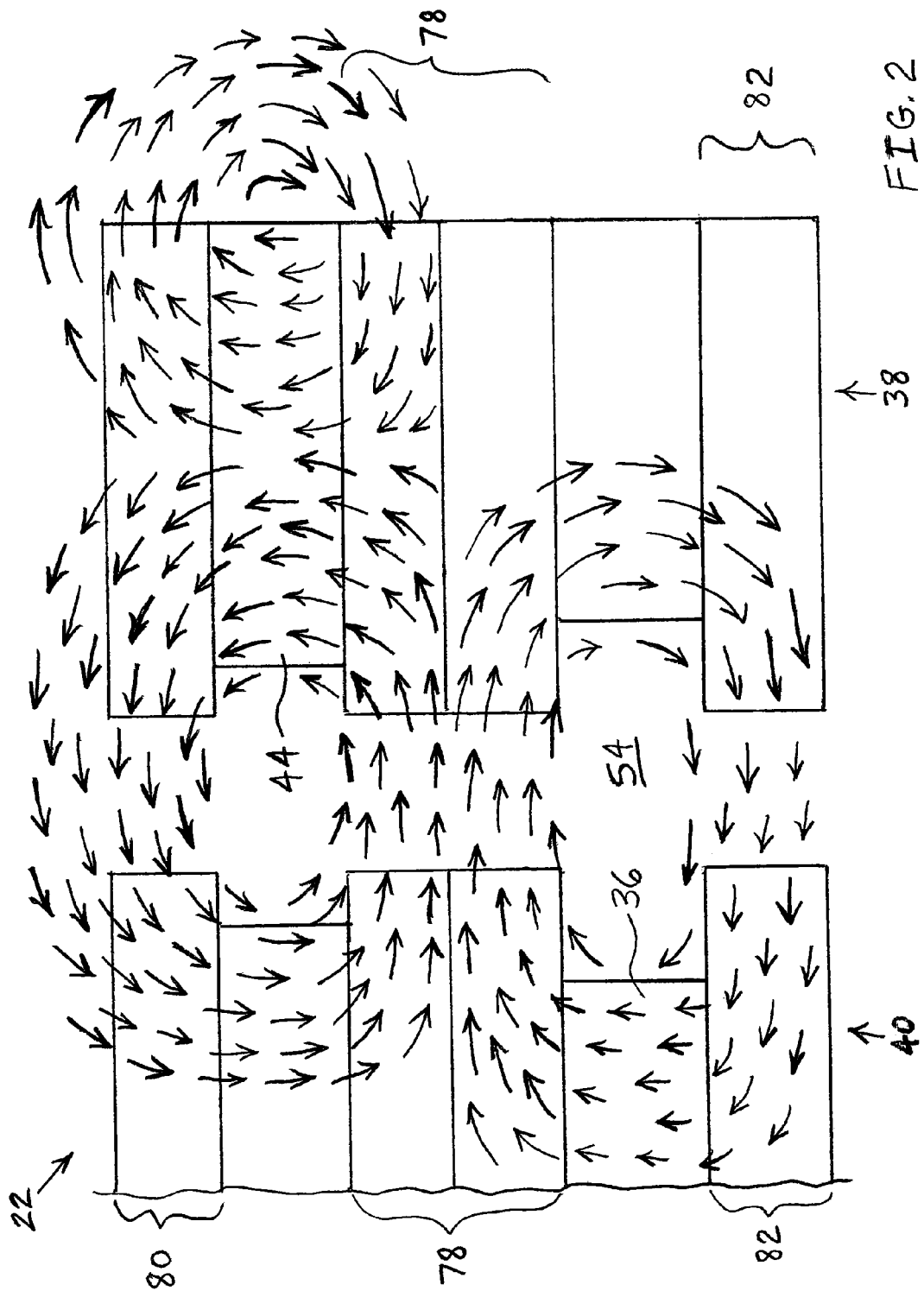
FIG. 2 is a schematic view of a B field plot of the motor assembly of the loudspeaker of FIG. 1.

As shown in FIG. 2, magnets 36 and 44 may have a same magnetic polarity. Specifically, in the embodiment of FIG. 2, each of magnets 36 and 44 has a north pole facing upward and a south pole facing downward. Because magnets 36 and 44 are on opposite sides of air gap 54, this same polarity results in magnets 36 and 44 contributing in a same direction to the flux in a middle magnetic gap 78. That is, magnets 36 and 44 both provide a magnetic flux in a radially outward direction (left to right direction in FIG. 2) in a portion of middle magnetic gap 78 that coincides with air gap 54, which is where voice coil 56 operates.

Voice coil 56 is at least partially disposed in air gap 54 and operates primarily in middle magnetic gap 78. Because voice coil 56 operates in the portion of air gap 54 within middle magnetic gap 78, voice coil 56 relies on the magnetic flux within middle magnetic gap 78 to exert a magnetic force on voice coil 56 and thereby cause voice coil 56 to move while electrical current is flowing through voice coil 56. Thus, it is advantageous to have a larger flux created with the contributions of both magnets 36 and 44 rather than a smaller net flux which would result from the flux of one magnet partially cancelling out the flux of the other magnet, as would be the case if magnets 36 and 44 had opposite polarities.

As also may be seen in FIG. 2, a top magnetic gap 80 is disposed axially adjacent top magnet 44 and opposite middle magnetic gap 78. A bottom magnetic gap 82 is disposed axially adjacent bottom magnet 36 and opposite middle magnetic gap 78. A direction of magnetic flux in top magnetic gap 80 and in bottom magnetic gap 82 may be opposite to the direction of flux within middle magnetic gap 78. More particularly, the flux in middle magnetic gap 78 is in a radially outward direction (left to right in FIG. 2) within air gap 54, but the flux is in a radially inward direction (right to left in FIG. 2) in both top magnetic gap 80 and bottom magnetic gap 82 within air gap 54. Thus, the direction of force exerted on voice coil 56 in top magnetic gap 80 and in bottom magnetic gap 82 may be opposite to the direction of force exerted on voice coil 56 in middle magnetic gap 78. Consequently, the flux in top magnetic gap 80 and in bottom magnetic gap 82 may limit the movement of voice coil 56 as caused by the flux in middle magnetic gap 78. Although whether the flux in middle magnetic gap 78 pushes voice coil 56 in an upward direction or a downward direction may depend upon the direction of current flow within voice coil 56, the flux in each of top magnetic gap 80 and in bottom magnetic gap 82 may push voice coil 56 in the opposite direction, thereby limiting the range of vertical movement of voice coil 56. For example, if the flux in middle magnetic gap 78 pushes voice coil 56 in a downward direction toward bottom magnetic gap 82, as voice coil 56 approaches bottom magnetic gap 82, voice coil 56 is increasingly influenced by the flux in bottom magnetic gap 82 and decreasingly influenced by the flux in middle magnetic gap 78. If the flux in middle magnetic gap 78 pushes voice coil 56 downward, then the flux in bottom magnetic gap 82 pushes voice coil 56 upward. Depending upon the degree of downward momentum possessed by voice coil 56 as provided by the flux in middle magnetic gap 78, the upwardly directed force exerted by the flux in bottom magnetic gap 82 operates to slow down voice coil 56 to a dead stop at some vertical level, and then possibly reverses the direction of movement of voice coil 56 (i.e., moves voice coil 56 in an upward direction). Thus, as described above, lower magnet 36, which is the source of the magnetic flux in bottom magnetic gap 82, may limit the downward axial movement of voice coil 56 within air gap 54.

Conversely, if the flux in middle magnetic gap 78 pushes voice coil 56 upward, then the flux in top magnetic gap 80 pushes voice coil 56 downward. Depending upon the degree of upward momentum possessed by voice coil 56 as provided by the flux in middle magnetic gap 78, the downwardly directed force exerted by the flux in top magnetic gap 80 operates to slow down voice coil 56 to a dead stop at some vertical level, and then possibly reverses the direction of movement of voice coil 56 (i.e., moves voice coil 56 in a downward direction). Thus, as described above, upper magnet 44, which is the source of the magnetic flux in top magnetic gap 80, may limit the upward axial movement of voice coil 56 within air gap 54. Top and bottom magnetic gaps 80, 82 may function as magnetic breaks and more symmetrically limit the vertical excursion of coil 56.

Because magnets 36, 44 have a same polarity, magnets 36, 44 do not have to be magnetized in isolation from each other. Thus, by virtue of magnets 36, 44 having a same magnetic polarity, magnets 36, 44 may be magnetized after speaker 20 has been assembled. Assembling speaker 20 before magnets 36, 44 have been magnetized may be easier than assembling speaker 20 after magnets 36, 44 have been magnetized because magnetized magnets may exert forces on other speaker parts, thereby making assembly difficult.

Another advantage of the structure of speaker 20 is that air may flow freely between cavity 72 and ambient air. More particularly, air may flow from the ambient environment, through each of throughbore 76, air gap 54 and gap 86, and into cavity 72. The air may exit out of cavity 72 to the ambient environment through the same path. Moreover, one or more of discs 32, 34 may have laterally-oriented air passageways (not shown) and axial recesses (not shown) for fluidly interconnecting air gap 54 with cavity 72 and/or the ambient environment through a central throughbore (not shown) in plate 74. In addition, one or more of rings 42, 46 may have laterally-oriented air passageways (not shown) for fluidly interconnecting air gap 54 with ambient air. The above-described air passageways may facilitate a pumped flow of air past voice coil 56 to thereby have a cooling effect on voice coil 56, which may improve the performance of voice coil 56. Moreover, cooling coil 56 may avoid demagnetization of magnets 36, 44 if the magnets are made of neomidium. Placing neomidium magnetic material too close to heat may tend to demagnetize the neomidium.

Figure 3:
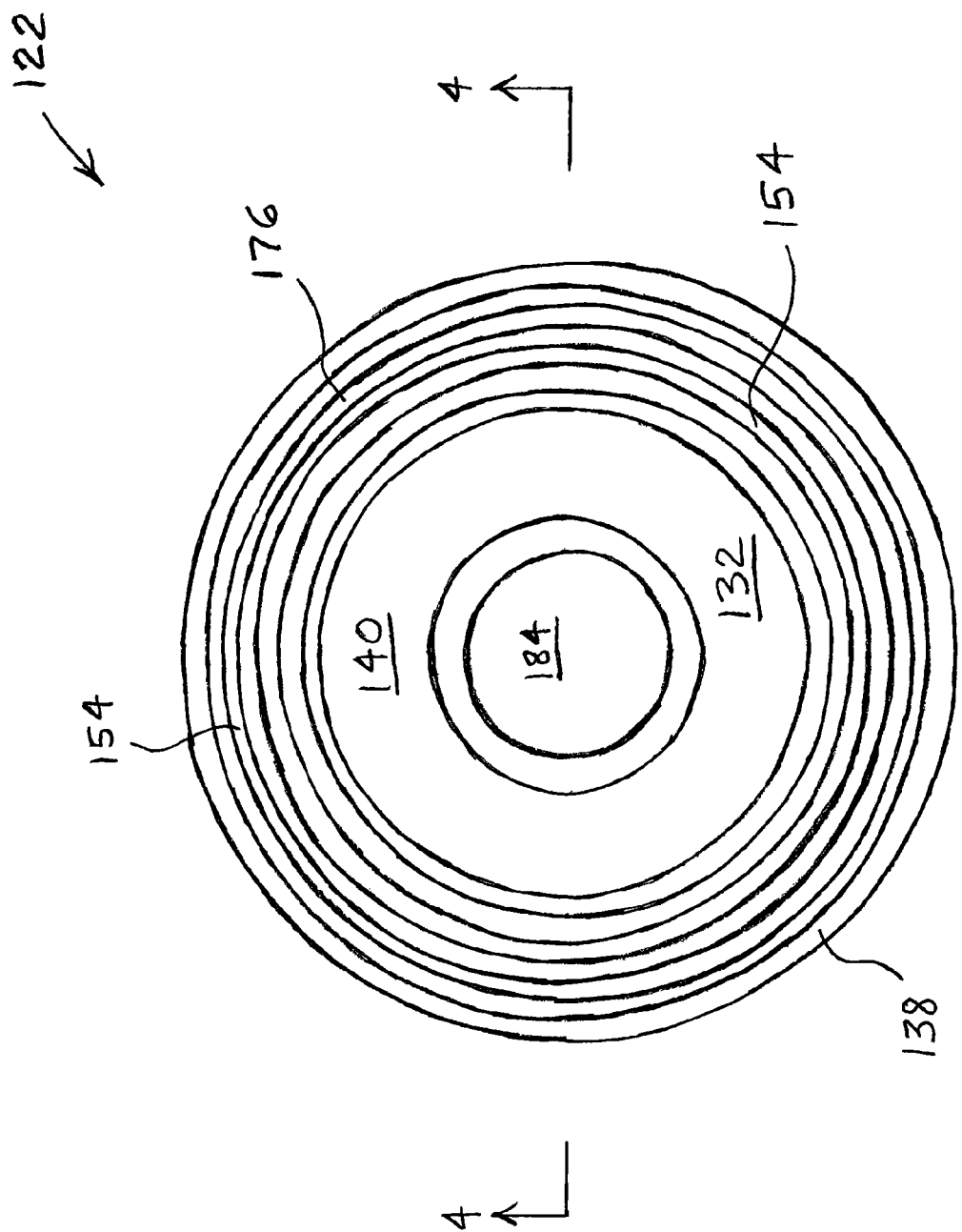
FIG. 3 is a bottom view of another embodiment of a motor assembly that may be used in a loudspeaker of the present invention.
Figure 4:
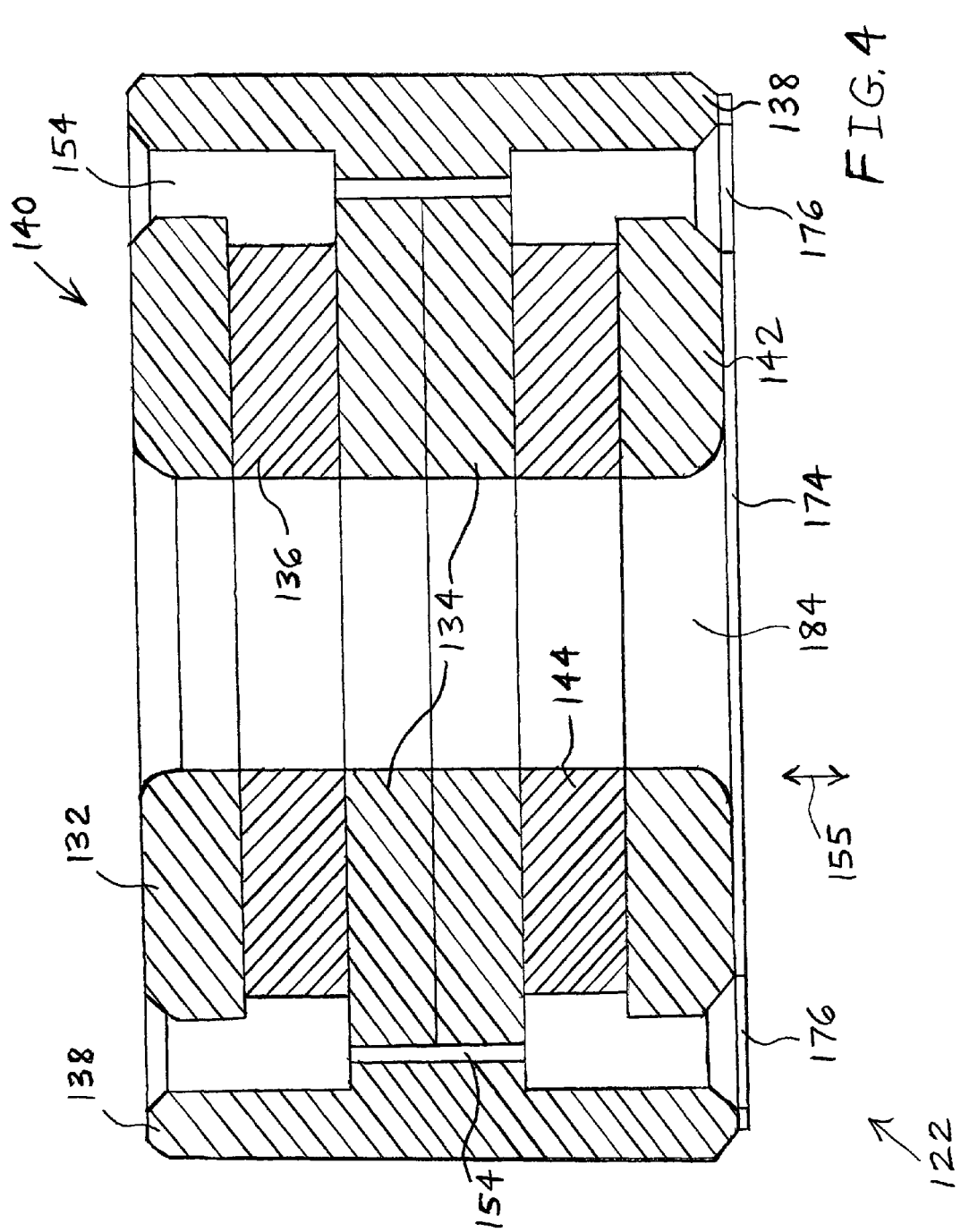
FIG. 4 is a cross-sectional view of another embodiment of a loudspeaker of the present invention including the motor assembly of FIG. 3 along the line 4-4.

Illustrated in FIGS. 3 and 4 is a bottom view and cross-sectional view, respectively, of another embodiment of a motor assembly 122 that may be used within a loudspeaker of the invention. Motor assembly 122 includes an "inner" magnet configuration that accommodates applications in which a magnet on the outer cylindrical wall is not desirable.

Motor assembly 122 includes a pole piece 140 having a central throughbore 184; a top steel ring 132; a permanent ring magnet 136 disposed below ring 132; a stacked pair of steel rings 134 disposed below magnet 136; another permanent ring magnet 144 disposed below rings 134; and another steel ring 142 disposed below ring magnet 144. The entire stack including steel ring 132, magnet 136, steel rings 134, magnet 144 and steel ring 142 may be adhered together.

Motor assembly 122 also includes a steel cylindrical structure or tube 138 surrounding pole piece 140. Cylindrical structure 138 may provide a magnetic return path for magnets 136, 144 to thereby complete the magnetic circuit.

An air gap 154 is defined between cylinder 138 and pole piece 140. The two opposite ends of air gap 154 are both open to air flow therethrough and are separated from each other in an axial direction indicated by double arrow 155.

Pole piece 140 has an exterior surface that is both stepped and annular. In the specific embodiment shown in FIG. 4, steel ring 132 has a larger outer diameter than magnet 136. Magnet 136 has a smaller outer diameter than the two discs 134 immediately below, which have equal outer diameters. Magnet 144 has an outer diameter that is equal to that of magnet 136. Steel ring 142 has an outer diameter that is equal to the outer diameter of steel ring 132.

A steel circular base plate 174 is adhered to both a bottom surface of cylinder 138 and a bottom surface of pole piece 140, and thereby interconnects cylinder 138 and pole piece 140. Base plate 174 includes a plurality of circumferentially evenly spaced throughbores 176 that fluidly interconnect air gap 154 with ambient air.

Figure 5:
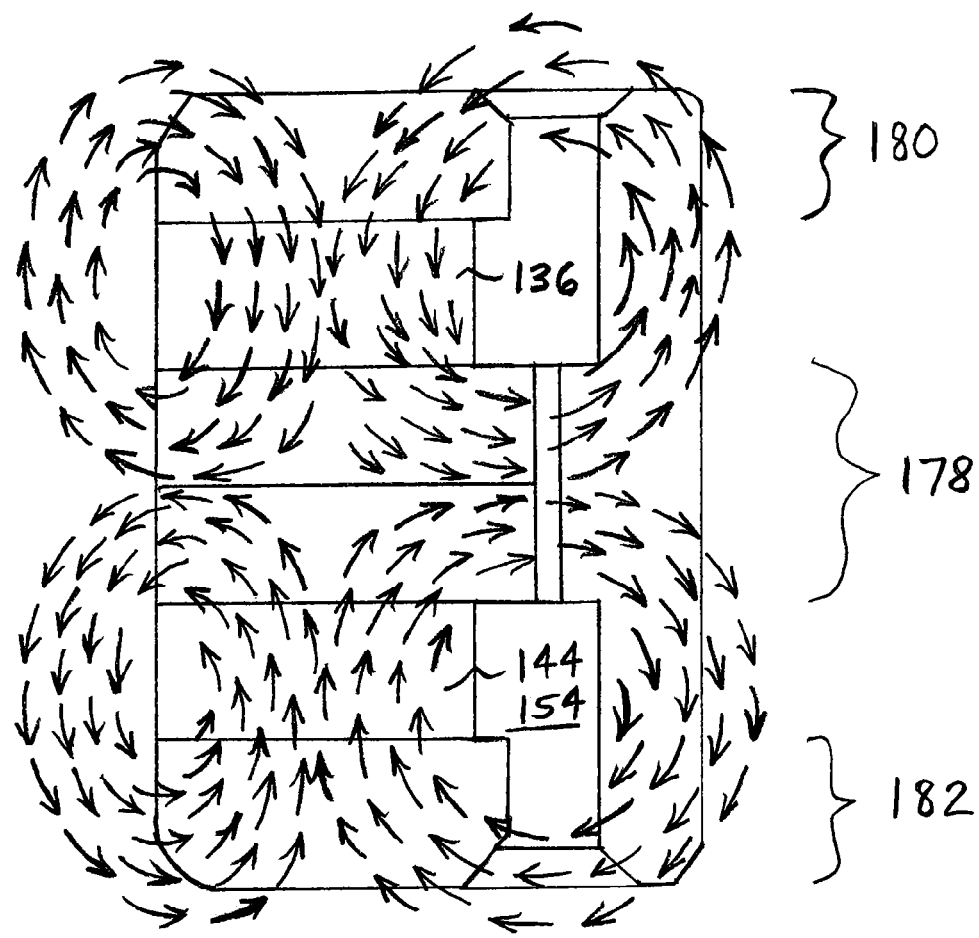
FIG. 5 is a schematic view of a B field plot of the motor assembly of FIG. 4.

As shown in FIG. 5, magnets 136 and 144 may have an opposite magnetic polarity. Specifically, in the embodiment of FIG. 5, magnet 144 has a north pole facing upward and magnet 136 has a north pole facing downward. Because magnets 136 and 144 are on the same side of air gap 154, this opposite polarity results in magnets 136 and 144 contributing in a same direction to the flux in a middle magnetic gap 178. That is, magnets 136 and 144 both provide a magnetic flux in a radially outward direction (left to right direction in FIG. 5) in a portion of middle magnetic gap 178 that coincides with air gap 154, which is where the voice coil operates.

As also may be seen in FIG. 5, a top magnetic gap 180 is disposed axially adjacent top magnet 136 and opposite middle magnetic gap 178. A bottom magnetic gap 182 is disposed axially adjacent bottom magnet 144 and opposite middle magnetic gap 178. A direction of magnetic flux in top magnetic gap 180 and in bottom magnetic gap 182 may be opposite to the direction of flux within middle magnetic gap 178. More particularly, the flux in middle magnetic gap 178 is in a radially outward direction (left to right in FIG. 5) within air gap 154, but the flux is in a radially inward direction (right to left in FIG. 5) in both top magnetic gap 180 and bottom magnetic gap 182 within air gap 154. Thus, the direction of force exerted on the voice coil in top magnetic gap 180 and in bottom magnetic gap 182 may be opposite to the direction of force exerted on the voice coil in middle magnetic gap 178. Consequently, the flux in top magnetic gap 180 and in bottom magnetic gap 182 may limit the movement of the voice coil as caused by the flux in middle magnetic gap 178. Although whether the flux in middle magnetic gap 178 pushes the voice coil in an upward direction or a downward direction may depend upon the direction of current flow within the voice coil, the flux in each of top magnetic gap 180 and in bottom magnetic gap 182 may push the voice coil in the opposite direction, thereby limiting the range of vertical movement of the voice coil. For example, if the flux in middle magnetic gap 178 pushes the voice coil in a downward direction toward bottom magnetic gap 182, as the voice coil approaches bottom magnetic gap 182, the voice coil is increasingly influenced by the flux in bottom magnetic gap 182 and decreasingly influenced by the flux in middle magnetic gap 178. If the flux in middle magnetic gap 178 pushes the voice coil downward, then the flux in bottom magnetic gap 182 pushes the voice coil upward. Depending upon the degree of downward momentum possessed-by the voice coil as provided by the flux in middle magnetic gap 178, the upwardly directed force exerted by the flux in bottom magnetic gap 182 operates to slow down the voice coil to a dead stop at some vertical level, and then possibly reverses the direction of movement of the voice coil (i.e., moves the voice coil in an upward direction). Thus, as described above, lower magnet 144, which is the source of the magnetic flux in bottom magnetic gap 182, may limit the downward axial movement of the voice coil within air gap 154.

Conversely, if the flux in middle magnetic gap 178 pushes the voice coil upward, then the flux in top magnetic gap 180 pushes the voice coil downward. Depending upon the degree of upward momentum possessed by the voice coil as provided by the flux in middle magnetic gap 178, the downwardly directed force exerted by the flux in top magnetic gap 180 operates to slow down the voice coil to a dead stop at some vertical level, and then possibly reverses the direction of movement of the voice coil (i.e., moves the voice coil in a downward direction). Thus, as described above, upper magnet 136, which is the source of the magnetic flux in top magnetic gap 180, may limit the upward axial movement of the voice coil within air gap 154. Top and bottom magnetic gaps 180, 182 may function as magnetic breaks and more symmetrically limit the vertical excursion of the voice coil.

Figure 6:
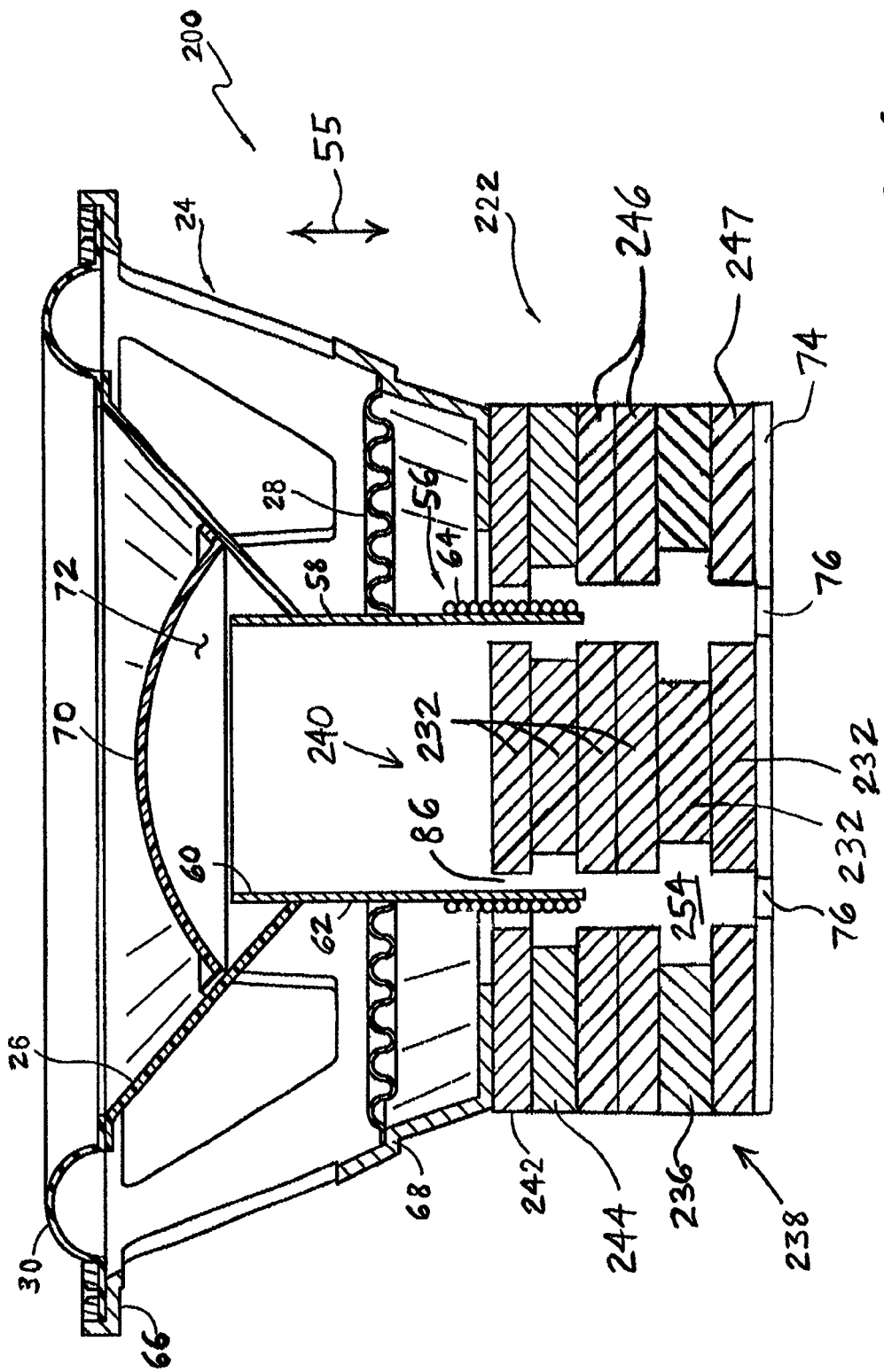
FIG. 6 is a cross-sectional view of yet another embodiment of a loudspeaker of the present invention.

Illustrated in FIG. 6 is shown an embodiment of a loudspeaker 200 of the present invention in which both of the magnets are on the outer cylinder. Loudspeaker 200 includes a motor assembly 222 having a pole piece 240 with a stack of six steel discs 232. Each of discs 232 may be adhered to each other.

Motor assembly 222 also includes a cylindrical structure 238 surrounding pole piece 240 and having a steel annular top ring 242 disposed atop an annular ring magnet 244. Magnet 244 in turn, is disposed atop a stack of another two steel annular rings 246. Immediately below steel rings 246 is another annular ring magnet 236. Magnet 236 is disposed atop another steel annular ring 247.

Each of top ring 242, magnetic ring 244, middle rings 246, magnetic ring 236, and bottom ring 247 may be adhered to each other. Discs 232 and rings 242, 246 and 247 may all be made of low carbon steel.

Pole piece 240 has an exterior surface that is both stepped and annular. In the specific embodiment shown in FIG. 6, the top one, the middle two, and the bottom one of steel discs 232 have an equal diameter that is larger than the diameter of the second disc 232 from the top. The second disc 232 from the bottom has the smallest diameter among discs 232.

Similarly, steel rings 242, 246 and 247 have an equal inner diameter that is smaller than the inner diameter of ring magnet 244. Ring magnet 247 has the largest inner diameter among all of the elements within cylinder 238. Other aspects of the structure of loudspeaker 200 may be substantially similar to that of loudspeaker 20, and thus are not described herein in order to avoid needless repetition.

Figure 7:
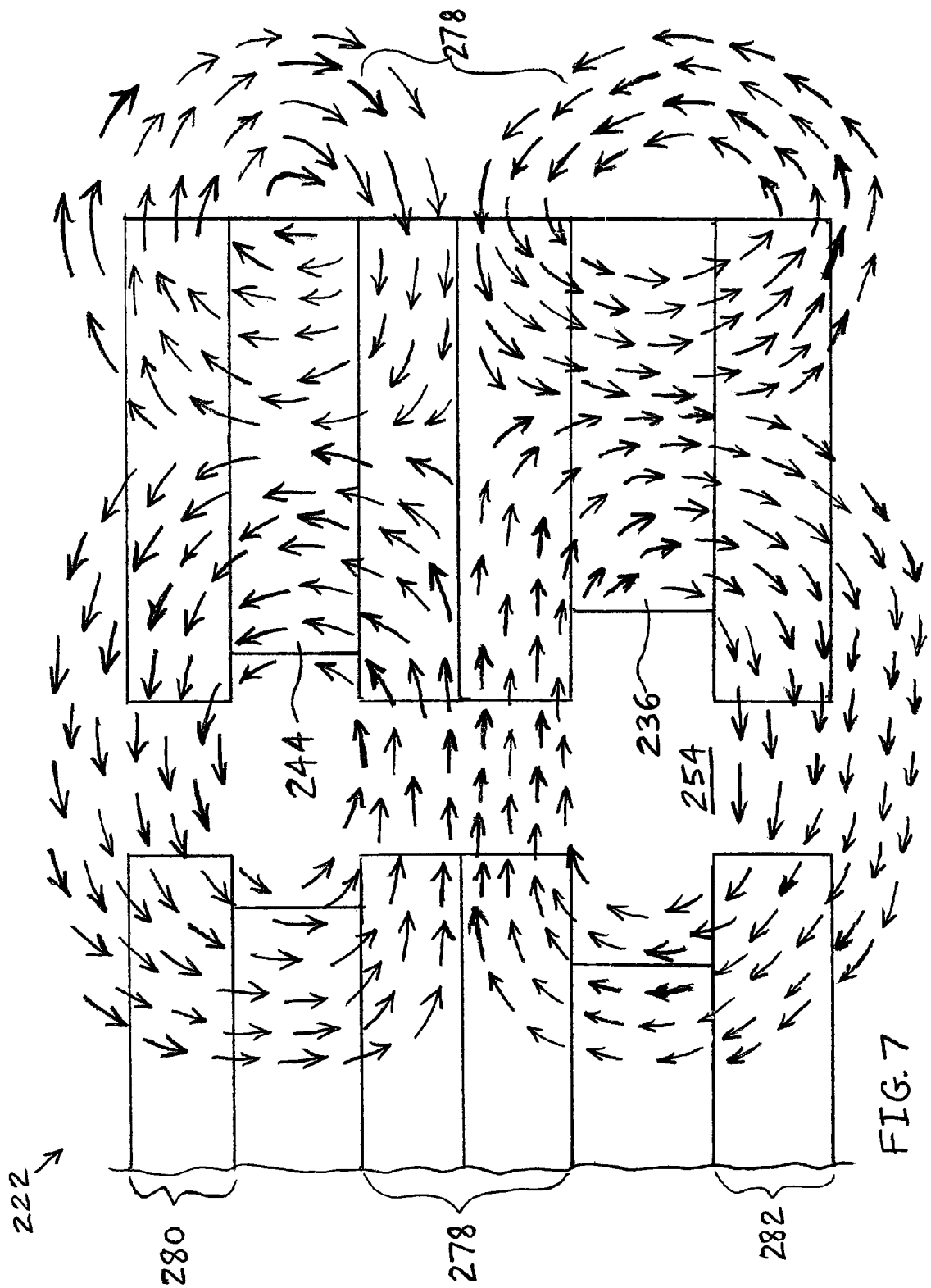
FIG. 7 is a schematic view of a B field plot of the motor assembly of the loudspeaker of FIG. 6.

As shown in FIG. 7, magnets 236 and 244 may have opposite magnetic polarities. Specifically, in the embodiment of FIG. 7, magnet 244 has a north pole facing upward and magnet 236 has a north pole facing downward. Because magnets 236 and 244 are on the same side of air gap 254, this opposite polarity results in magnets 236 and 244 contributing in a same direction to the flux in a middle magnetic gap 278. That is, magnets 236 and 244 both provide a magnetic flux in a radially outward direction (left to right direction in FIG. 7) in a portion of middle magnetic gap 278 that coincides with air gap 254, which is where voice coil 56 operates.

Voice coil 56 is at least partially disposed in air gap 254 and operates primarily in middle magnetic gap 278. Because voice coil 56 operates in the portion of air gap 254 within middle magnetic gap 278, voice coil 56 relies on the magnetic flux within middle magnetic gap 278 to exert a magnetic force on voice coil 56 and thereby cause voice coil 56 to move while electrical current is flowing through voice coil 56. Thus, it is advantageous to have a larger flux created with the contributions of both magnets 236 and 244 rather than a smaller net flux which would result from the flux of one magnet partially cancelling out the flux of the other magnet, as would be the case if magnets 236 and 244 had opposite polarities.

As also may be seen in FIG. 7, a top magnetic gap 280 is disposed axially adjacent top magnet 244 and opposite middle magnetic gap 278. A bottom magnetic gap 282 is disposed axially adjacent bottom magnet 236 and opposite middle magnetic gap 278. A direction of magnetic flux in top magnetic gap 280 and in bottom magnetic gap 282 may be opposite to the direction of flux within middle magnetic gap 278. More particularly, the flux in middle magnetic gap 278 is in a radially outward direction (left to right in FIG. 7) within air gap 254, but the flux is in a radially inward direction (right to left in FIG. 7) in both top magnetic gap 280 and bottom magnetic gap 282 within air gap 254. Thus, the direction of force exerted on voice coil 56 in top magnetic gap 280 and in bottom magnetic gap 282 may be opposite to the direction of force exerted on voice coil 56 in middle magnetic gap 278. Consequently, the flux in top magnetic gap 280 and in bottom magnetic gap 282 may limit the movement of voice coil 56 as caused by the flux in middle magnetic gap 278. Although whether the flux in middle magnetic gap 278 pushes voice coil 56 in an upward direction or a downward direction may depend upon the direction of current flow within voice coil 56, the flux in each of top magnetic gap 280 and in bottom magnetic gap 282 may push voice coil 56 in the opposite direction, thereby limiting the range of vertical movement of voice coil 56. For example, if the flux in middle magnetic gap 278 pushes voice coil 56 in a downward direction toward bottom magnetic gap 282, as voice coil 56 approaches bottom magnetic gap 282, voice coil 56 is increasingly influenced by the flux in bottom magnetic gap 282 and decreasingly influenced by the flux in middle magnetic gap 278. If the flux in middle magnetic gap 278 pushes voice coil 56 downward, then the flux in bottom magnetic gap 282 pushes voice coil 56 upward. Depending upon the degree of downward momentum possessed by voice coil 56 as provided by the flux in middle magnetic gap 278, the upwardly directed force exerted by the flux in bottom magnetic gap 282 operates to slow down voice coil 56 to a dead stop at some vertical level, and then possibly reverses the direction of movement of voice coil 56 (i.e., moves voice coil 56 in an upward direction). Thus, as described above, lower magnet 236, which is the source of the magnetic flux in bottom magnetic gap 282, may limit the downward axial movement of voice coil 56 within air gap 254.

Conversely, if the flux in middle magnetic gap 278 pushes voice coil 56 upward, then the flux in top magnetic gap 280 pushes voice coil 56 downward. Depending upon the degree of upward momentum possessed by voice coil 56 as provided by the flux in middle magnetic gap 278, the downwardly directed force exerted by the flux in top magnetic gap 280 operates to slow down voice coil 56 to a dead stop at some vertical level, and then possibly reverses the direction of movement of voice coil 56 (i.e., moves voice coil 56 in a downward direction). Thus, as described above, upper magnet 244, which is the source of the magnetic flux in top magnetic gap 280, may limit the upward axial movement of voice coil 56 within air gap 254. Top and bottom magnetic gaps 280, 282 may function as magnetic breaks and more symmetrically limit the vertical excursion of voice coil 56.

Another advantage of the structure of speaker 200 is that air may flow freely between cavity 72 and ambient air. More particularly, air may flow from the ambient environment, through each of throughbore 76, air gap 254 and gap 86, and into cavity 72. The air may exit out of cavity 72 to the ambient environment through the same path. Moreover, one or more of discs 232 may have laterally-oriented air passageways (not shown) and axial recesses (not shown) for fluidly interconnecting air gap 254 with cavity 72 and/or the ambient environment through a central throughbore (not shown) in plate 74. In addition, one or more of rings 242, 246, 247 may have laterally-oriented air passageways (not shown) for fluidly interconnecting air gap 254 with ambient air. The above-described air passageways may facilitate a pumped flow of air past voice coil 56 to thereby have a cooling effect on voice coil 56, which may improve the performance of voice coil 56.

Figure 8:
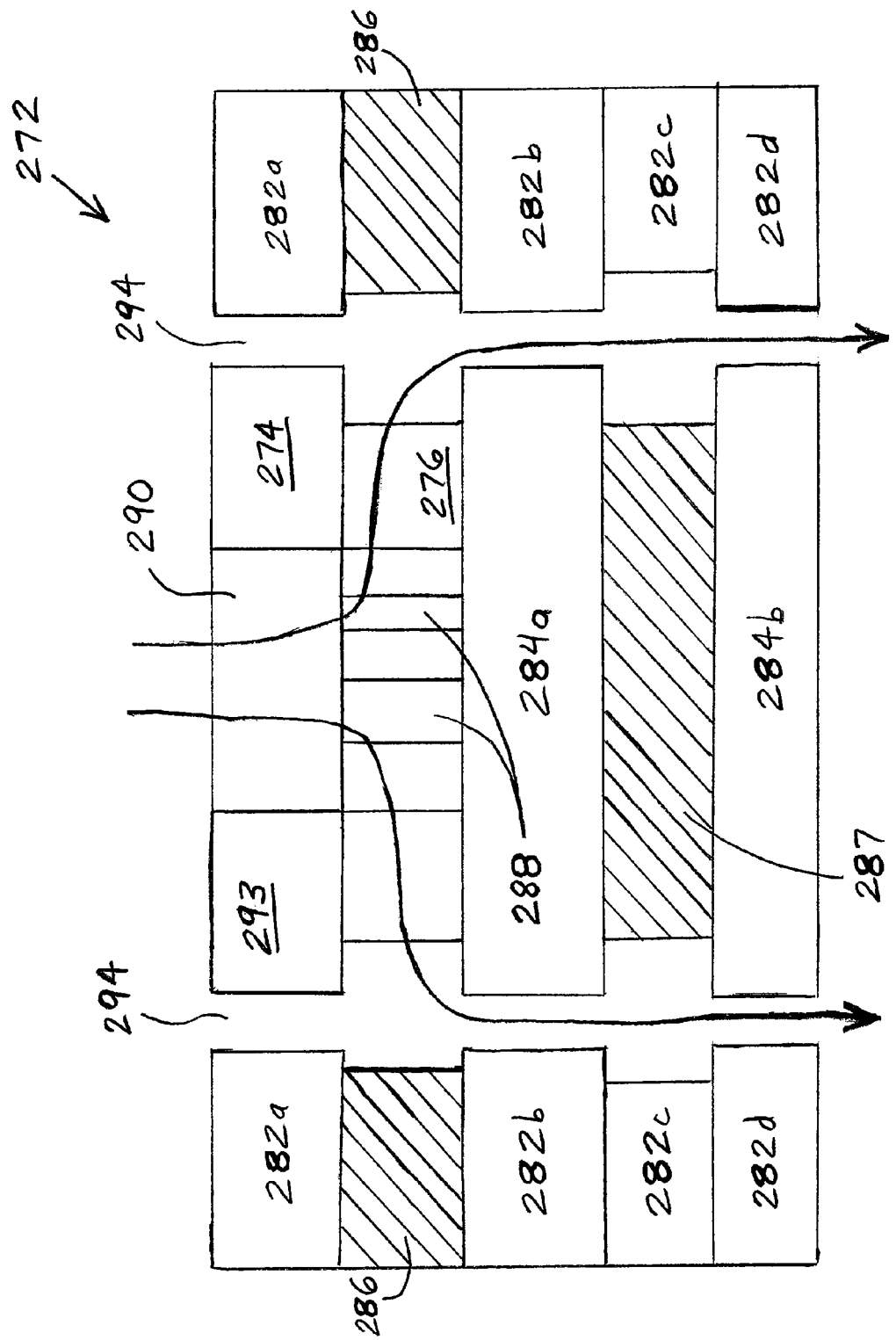
FIG. 8 is a cross-sectional view of another embodiment of a motor assembly of the present invention.

Illustrated in FIG. 8 is a cross-sectional view of another embodiment of a motor assembly 272 of the present invention including a pole 293, an annular magnet 286, a disc-shaped magnet 287, a plurality of annular steel rings 282a-d, and steel discs 284a-b. Magnets 286, 287 may have the same polarity.

Pole 293 includes a throughbore or upwardly facing recess 290. Pole 293 includes a larger diameter upper section 274 and a smaller diameter lower section 276. A plurality of circumferentially spaced air passages 288 extend from the lower portion of throughbore 290 to the outer surface of lower section 276. Air passages 288 may be rectangular in cross section.

Air flow, as indicated by the arrows, may be driven by the force exerted on air trapped inside a dust cap, such as dust cap 70, and the inner circumferential surface of a voice coil, such as voice coil 56. The air flows in a generally lateral direction through air passages 288 in pole 293, and then flows downward through a cylindrical air gap 294. The air may flow in a direction opposite to that shown, depending on the current direction of movement of the spider.

As shown in FIG. 8, pole piece 293 includes a plurality of laterally-oriented air passageways 288 at a substantially same vertical level as that of magnet 286. Air passageways 288 are in fluid communication with an upwardly facing recess 290.

Figure 9:
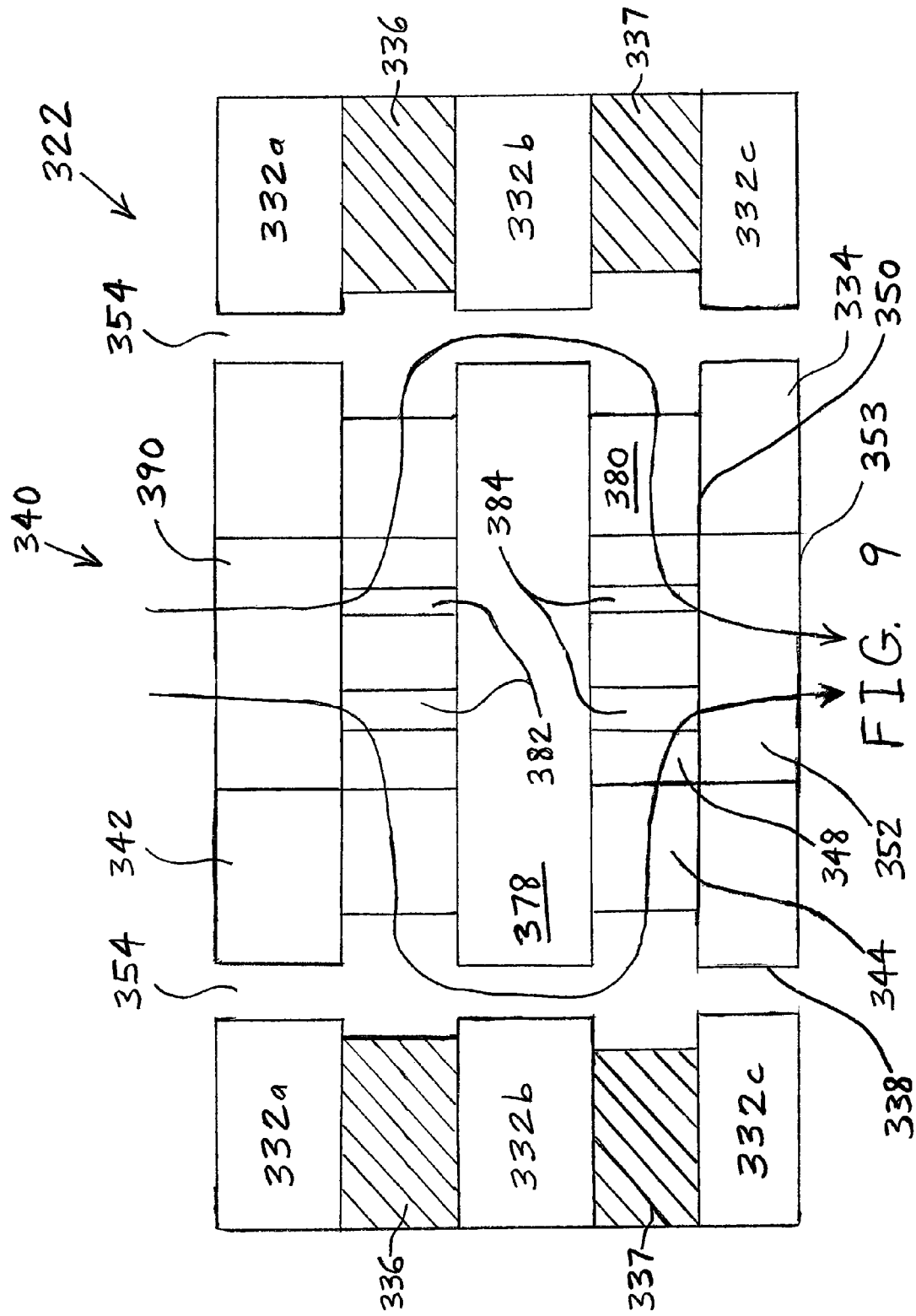
FIG. 9 is a cross-sectional view of yet another embodiment of a motor assembly of the present invention.

Illustrated in FIG. 9 is a cross-sectional view of yet another embodiment of a motor assembly 322 of the present invention including a pole 340 having a top pole half 342 and a bottom pole half 344. Motor assembly 322 also includes a top annular magnet 336, a bottom annular magnet 337, a plurality of annular steel rings 332a-c, and a donut-shaped back plate 334. Magnets 336, 337 may have opposite polarities such that magnets 336, 337 provide flux in a same direction through steel ring 332b. For example, magnet 336 may have its north pole on its top surface, while magnet 337 has its north pole on its bottom surface. Alternatively, magnet 336 may have its north pole on its bottom surface, while magnet 337 has its north pole on its top surface. Top pole half 342 may have a structure that is similar to that of pole 293.

Bottom pole half 344 includes a bore 348 that is in communication with a bottom surface 350 of bottom half 44, and that extends only partially through the height of bottom half 344. Bore 348 is aligned and in communication with a throughbore 352 extending through back plate 334. Throughbore 352 terminates with a port 353 which is open to atmosphere at back plate 334. Bottom half 344 includes a larger diameter upper section 378 and a smaller diameter lower section 380. A plurality of circumferentially spaced air passages 384 extend from bore 348 to the outer surface of lower section 380. Air passages 384 may be rectangular in cross section. Back plate 334 may have an annular outer surface 338 facing a cylindrical air gap 354.

Air flow, as indicated by the arrows, may be driven by the force exerted on air trapped inside a dust cap, such as dust cap 70, and the inner circumferential surface of a voice coil, such as voice coil 56. The air flows in a generally lateral direction through air passages 382 in top pole half 342, and then flows downward through air gap 354. The air then flows in an opposite generally lateral direction through air passages 384 in bottom pole half 344, through throughbore 352 in back plate 334, and out through port 353. The overall path of air flow may be spiraling. That is, the air flow path may be three-dimensional, having components in a clockwise or counterclockwise direction around pole piece 340. The air may flow in a direction opposite to that shown, depending on the current direction of movement of the spider and/or the former.

As shown in FIG. 9, pole piece 340 includes a plurality of laterally-oriented air passageways 382 in fluid communication with an upwardly facing recess 390 and disposed at a substantially same vertical level as magnet 336. Pole piece 340 also includes a plurality of laterally-oriented air passageways 384 at a substantially same vertical level as magnet 337 and in fluid communication with a downwardly facing recess in the form of throughbore 352.

Figure 10:
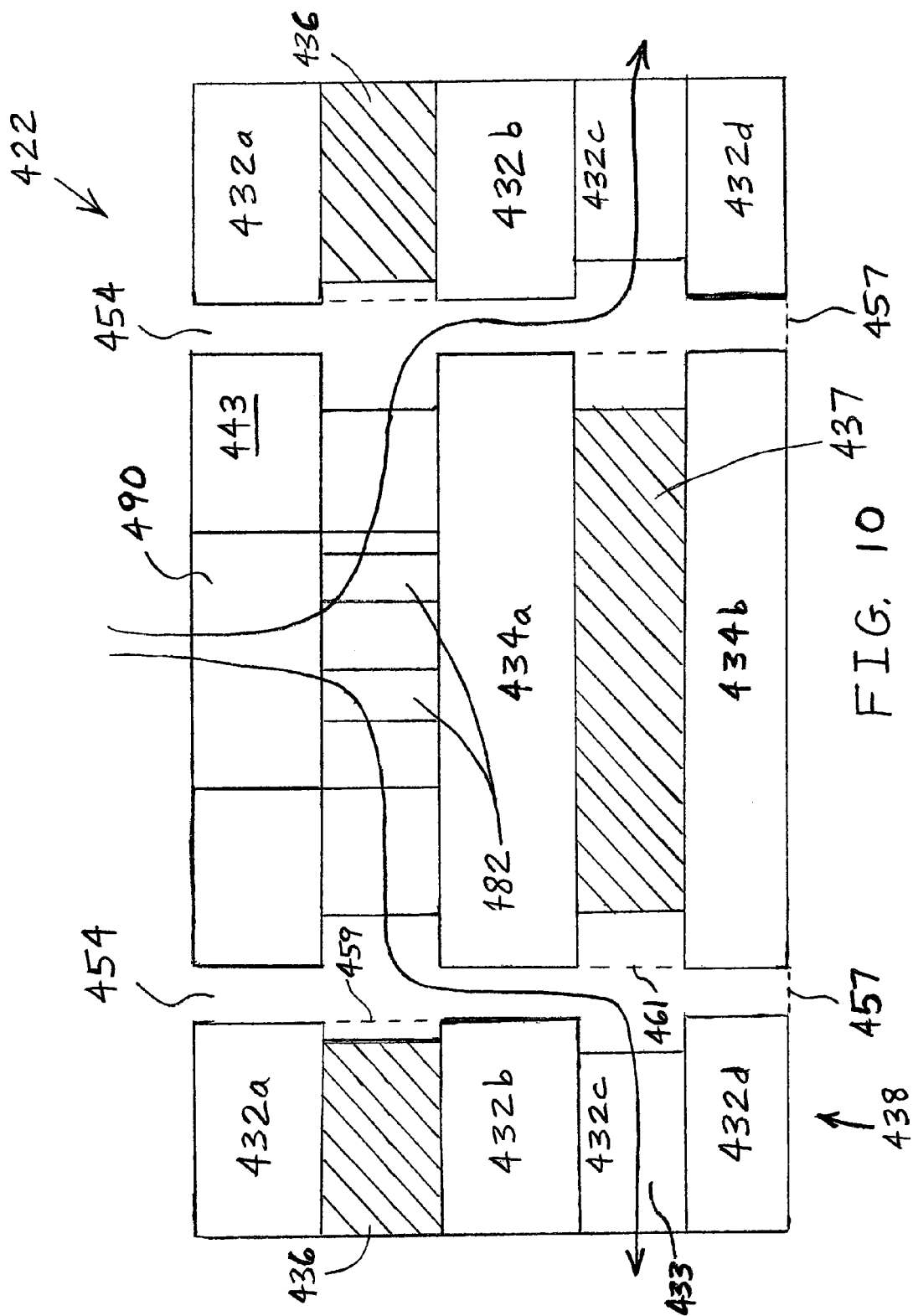
FIG. 10 is a cross-sectional view of a further embodiment of a motor assembly of the present invention.

Illustrated in FIG. 10 is a cross-sectional view of yet another embodiment of a motor assembly 422 of the present invention including a pole 443, an annular magnet 436, a disc-shaped magnet 437, a plurality of annular steel rings 432a-d, and steel discs 434a-b. Magnets 436, 437 may have the same polarity. Pole 443 may have a structure that is similar to that of pole 293.

Air flow, as indicated by the arrows, may be driven by the force exerted on air trapped inside a dust cap, such as dust cap 70, and the inner circumferential surface of a voice coil, such as voice coil 56. The air flows in a generally lateral direction through air passages 482 in pole 443, and then flows downward within a cylindrical air gap 454. The air flow may then exit air gap 454 through laterally-oriented air passageways 433 in steel ring 432c.

As shown in FIG. 10, pole piece 443 includes a plurality of laterally-oriented air passageways 482 in fluid communication with an upwardly facing recess 490 and disposed at a substantially same vertical level as magnet 436. Cylindrical structure 438 includes a plurality of laterally-oriented air passageways 433 at a substantially same vertical level as magnet 437.

Optional annular non-ferrous (e.g., aluminum) rings 459, 461, the edges of which are indicated by dashed lines in FIG. 10, may be adhered to magnets 436, 437, respectively, in order to further smooth out the air flow path within air gap 454

Each of the embodiments shown herein includes at least one magnet that is recessed in an outer surface of the pole piece and/or recessed in an inner surface of the cylindrical structure. As best shown in FIGS. 2 and 7, the recessed position of the magnet enables the flux from each of the two magnets to be directed in a substantially same lateral direction within the air gap. Within the scope of the invention, a non-ferrous ring may be disposed in any number of these recesses between the air gap and one of the magnets such that the ring provides the air gap with a smooth boundary. Such a smooth boundary may decrease the resistance to air flow within the air gap, and may thereby increase the speed and volume of air flow through the air gap. Accordingly, the cooling effect on the voice coil as a result of the air flow may be improved.

As described above, the scope of the invention includes embodiments in which magnets are disposed on opposite sides of the air gap; embodiments in which magnets are disposed only on the inner side of the air gap; and embodiments in which magnets are disposed only on the outer side of the air gap. In the embodiments in which magnets are disposed only on the inner side of the air gap, the magnet outer diameter may be less than the inner diameter of the magnetic return path. Conversely, in the embodiments in which magnets are disposed only on the outer side of the air gap, the magnet inner diameter may be greater than the outer diameter of the magnetic return path.

The embodiments disclosed herein include low reluctance magnetic return paths for the magnets. That is, the flux travels through low reluctance steel in some portion of its path from a north pole to a south pole. However, it is within the scope of the invention for the magnetic return paths to be high reluctance, without any steel within the magnetic return path. That is, the magnetic return path may travel entirely through high reluctance air. In order to compensate for having higher reluctance magnetic return paths, the magnets may be made stronger with a higher degree of magnetism.

While this invention has been described as having an exemplary design, the present invention may be further modified within the spirit and scope of this disclosure. This application is therefore intended to cover any variations, uses, or adaptations of the invention using its general principles.

What is claimed is:

1. A low frequency transducer arrangement comprising:
a pole piece;
a substantially cylindrical structure surrounding the pole piece;
an air gap, wherein the air gap is between the pole piece and the substantially cylindrical structure, the air gap is substantially cylindrical, two opposite ends of the air gap both being open to allow air to flow through the air gap and separated from each other in an axial direction;
a first magnet being disposed in either the pole piece or the substantially cylindrical structure;
a second magnet being disposed in either the pole piece or the substantially cylindrical structure,
a middle magnetic gap separating the second magnet in the axial direction from the first magnet;
a top magnetic gap being disposed axially adjacent the first magnet and opposite the middle magnetic gap;
a bottom magnetic gap being disposed axially adjacent the second magnet and opposite the middle magnetic gap; and
a voice coil at least partially disposed in the air gap and configured to operate in the middle magnetic gap,
wherein the first magnet and the second magnet provide flux in a same direction in the middle magnetic gap, and wherein the opposite end of the air gap axially adjacent to the bottom magnetic gap has direct access to ambient air.

2. The arrangement of claim 1 further comprising a base plate attached to a bottom surface of the pole piece and to a bottom surface of the substantially cylindrical structure, the base plate including at least one throughbore, wherein the at least one throughbore is disposed axially adjacent to the air gap and fluidly interconnects the air gap with ambient air.

3. The arrangement of claim 1 wherein the voice coil is moveable within the air gap in the axial direction.

4. The arrangement of claim 1 wherein each of the first magnet and the second magnet is disposed in the pole piece.

5. The arrangement of claim 1 wherein each of the first magnet and the second magnet is disposed in the substantially cylindrical structure.

6. The arrangement of claim 5 wherein the pole piece includes:
an upwardly facing recess;
a plurality of laterally-oriented first air passageways in fluid communication with the upwardly facing recess and disposed at a substantially same vertical level as the first magnet;
a plurality of laterally-oriented second air passageways at a substantially same vertical level as the second magnet; and
a downwardly facing recess in fluid communication with the second air passageways.

7. The arrangement of claim 1 wherein the first magnet is disposed in the substantially cylindrical structure and the second magnet is disposed in the pole piece.

8. The arrangement of claim 7 wherein the pole piece includes a plurality of laterally-oriented air passageways at a substantially same vertical level as the first magnet.

9. The arrangement of claim 8 wherein the substantially cylindrical structure includes a plurality of laterally-oriented air passageways at a substantially same vertical level as the second magnet.

10. A low frequency transducer arrangement comprising:
a pole piece;
a substantially cylindrical structure surrounding the pole piece;
an air gap, wherein the air gap is between the pole piece and the substantially cylindrical structure, the air gap is substantially cylindrical, two opposite ends of the air gap both being open to allow air to flow through the air gap and separated from each other in an axial direction;
an upper magnet being disposed in either the pole piece or the substantially cylindrical Structure;
a lower magnet being disposed in either the pole piece of the substantially cylindrical structure;
a magnetic gap separating the lower magnet in the axial direction from the upper magnet; and
a voice coil at least partially disposed in the air gap and configured to operate in the magnetic gap, wherein the lower magnet is configured to limit downward axial movement of the voice coil within the air gap,
wherein the opposite end of the air gap located closest to the lower magnet has direct access to ambient air.

11. The arrangement of claim 10 further comprising a base plate attached to a bottom surface of the pole piece and to a bottom surface of the substantially cylindrical structure, the base plate including at least one throughbore, wherein the at least one throughbore is disposed axially adjacent to the air gap and fluidly interconnects the air gap with ambient air.

12. The arrangement of claim 10 wherein the magnetic gap comprises a middle magnetic gap, the first and second magnets being configured to provide flux in a same direction in the middle magnetic gap, a top magnetic gap being disposed axially adjacent the first magnet and opposite the middle magnetic gap, a bottom magnetic gap being disposed axially adjacent the second magnet and opposite the middle magnetic gap.

13. The arrangement of claim 12 wherein the lower magnet is configured to provide flux in the bottom magnetic gap in a direction substantially opposite to the direction of the flux in the middle magnetic gap.

14. The arrangement of claim 10 wherein each of the upper magnet and the lower magnet is disposed in the substantially cylindrical structure, the pole piece including:
an upwardly facing recess;
a plurality of laterally-oriented first air passageways in fluid communication with the upwardly facing recess and disposed at a substantially same vertical level as the first magnet;
a plurality of laterally-oriented second air passageways at a substantially same vertical level as the second magnet; and
a downwardly facing recess in fluid communication with the second air passageways.

15. The arrangement of claim 10 wherein the upper magnet is disposed in the substantially cylindrical structure and the lower magnet is disposed in the pole piece, the pole piece including a plurality of laterally-oriented air passageways at a substantially same vertical level as the first magnet, the substantially cylindrical structure including a plurality of laterally-oriented air passageways at a substantially same vertical level as the second magnet.

16. A low frequency transducer arrangement comprising:
a pole piece;
a substantially cylindrical structure surrounding the pole piece;
an air gap, wherein the air gap is between the pole piece and the substantially cylindrical structure, the air gap is substantially cylindrical, two opposite ends of the air gap both being configured to enable to air flow through the air gap and being separated from each other in an axial direction;
a first magnet being disposed in either the pole piece or the substantially cylindrical structure;
a second magnet being disposed in either the pole piece of the substantially cylindrical structure;
a magnetic gap separating the second magnet in the axial direction from the first magnet;
a non-ferrous ring disposed in a recess between the air gap and the at least one of the first magnet and the second magnet such that the ring provides the air gap with a substantially smooth boundary; and
a voice coil at least partially disposed in the air gap and configured to operate in the magnetic gap,
wherein at least one of the first magnet and the second magnet being at least one of:
recessed in an outer surface of the pole piece, and
recessed in an inner surface of the cylindrical structure,
wherein the first magnet and the second magnet provide flux in a same direction in the magnetic gap, and wherein the opposite end of the air gap located closest to the second magnet has direct access to ambient air.

17. The arrangement of claim 16 further comprising a base plate attached to a bottom surface of the pole piece and to a bottom surface of the substantially cylindrical structure, the base plate including at least one throughbore, wherein the at least one throughbore is disposed axially adjacent to the air gap and fluidly interconnects the air gap with ambient air.

18. The arrangement of claim 16 wherein the magnetic gap comprises a middle magnetic gap, a top magnetic gap being disposed axially adjacent the first magnet and opposite the middle magnetic gap, a bottom magnetic gap being disposed axially adjacent the second magnet and opposite the middle magnetic gap.

19. The arrangement of claim 16 wherein the recess is partially defined by one of a steel disc in the pole piece and a steel ring in the substantially cylindrical structure.

20. The arrangement of claim 16 wherein the voice coil is moveable within the air gap in an axial direction.

* * * * *